United States Patent [19]

Furuya

[11] Patent Number: 5,170,488
[45] Date of Patent: Dec. 8, 1992

[54] METHOD OF SWITCHING SPEECH PATH IN RADIOTELEPHONE SYSTEM

[75] Inventor: Tsuneo Furuya, Yokohama, Japan

[73] Assignee: Hitachi, Ltd., Tokyo, Japan

[21] Appl. No.: 568,069

[22] Filed: Aug. 16, 1990

[30] Foreign Application Priority Data

Dec. 15, 1989 [JP] Japan .................................. 1-323981

[51] Int. Cl.$^5$ .............................................. H04B 7/00
[52] U.S. Cl. .................................. 455/56.1; 455/67.1; 455/89; 379/59; 379/61
[58] Field of Search ........................ 379/59, 60, 61, 62; 455/88, 89, 62, 56, 56.1, 67.1

[56] References Cited

U.S. PATENT DOCUMENTS

| | | | |
|---|---|---|---|
| 3,906,166 | 9/1975 | Cooper et al. | 379/60 |
| 4,737,978 | 4/1988 | Burke et al. | 379/60 |
| 4,765,753 | 8/1988 | Schmidt | 379/60 |
| 4,879,740 | 11/1989 | Nagashima et al. | 379/60 |

Primary Examiner—Reinhard J. Eisenzopf
Assistant Examiner—Timothy H. Keough
Attorney, Agent, or Firm—Antonelli, Terry, Stout & Kraus

[57] ABSTRACT

A speech path switching method for use in a radiotelephone system suitable for a private branch radio exchange system. In the radiotelephone system, portable-type cordless telephone sets are respectively connected via intrasystem base stations each disposed in an associated location in the system and each provided with a radio transmission and reception function, a portable-type cordless telephone set in use for a speech transmits, in order to change a combination with a base station, a speech path switch request through a manual operation or in an automatic manner to available base stations existing in the proximity of the base station currently being linked with the telephone set. Each base station sequentially sends a response signal in reply to the speech path switch request such that the telephone set monitors a reception level of the response signal to determine as a switch destination a base station of which the response signal develops a highest reception level as a result of the monitor operation. The telephone set instructs a selective initiation of the base station as the switch destination via the base station having been linked with the telephone set. Thereafter, a speech is carried out via a speech path in a combination of the telephone set and the destination base station. With the provision above, a speech path having a high reception level can be manually or automatically re-established at a desired point of time in a short period of time.

14 Claims, 6 Drawing Sheets

METHOD OF SWITCHING SPEECH PATH IN RADIOTELEPHONE SYSTEM

BACKGROUND OF THE INVENTION

The present invention relates to a method of switching a speech path in a radiotelephone system in which even when a portable-type cordless telephone set is moved through a plurality of service zones, a telephone speech can be achieved with a satisfactory speech quality, and in particular, to a speech path switching method suitable for a private branch radio exchange system.

In the radiotelephone system, as a method of controlling a switching operation between speech paths during a speech, there has been well known, for example, a hand-over control of an automobile telephone. An example of a switch method associated with the hand-over control has been described in pages 197 to 200 of the "Channel Switch During Speech" published on Feb. 10, 1985 (Automobile Telephone, the Electronics and Communication Engineers of Japan). As described in this article, the speech path is automatically switched during a speech; moreover, the switch operation is initiated on the side of a radio channel control station, namely, on a telephone exchange side.

In other words, in an identical radio channel control station, the channel switch is achieved during a speed such that while radio waves of the respective base stations are changed in the proximity of boundaries between service zones, the system selects from a plurality of zones a zone associated with a highest reception level to establish a connection to the zone.

However, in accordance with the conventional technology above, a speech path once established between a radio mobile telephone set (station) and a radio base station equipment may be re-established depending on a result of an operation to monitor a reception level in the radio base station equipment. Consequently, the speech path cannot be re-established on the side of the radio mobile telephone set. Actually, in a speech using radio waves, depending on a combination of a radio mobile telephone set and a radio base station equipment, a speech may be conducted through a speech path in which the radio communication is not carried out in a satisfactory state. Even in such a case, the speech path cannot be re-established from the side of the radio mobile equipment.

SUMMARY OF THE INVENTION

It is therefore a primary object of the present invention to provide a speech path switching method in a radiotelephone system in which a speech path associated with a high reception level can be re-established from a portable-type cordless telephone set at a desired point of time.

Another object of the present invention is to provide a speech path switching method in a radiotelephone system in which a speech path associated with a high reception level can be automatically re-established from a portable-type cordless telephone set.

Still another object of the present invention is to provide a speech path switching method in a radiotelephone system in which a private branch radio exchange system is considered to be employed as the radiotelephone system.

Further another object of the present invention is to provide a speech path switching method in a radiotelephone system in which a new speech path associated with a high reception level can be re-established from a portable-type cordless telephone set in a short period of time.

The primary object above is achieved as follows in accordance with the present invention. Namely, in a radiotelephone system in which portable-type cordless telephone sets are respectively connected via intrasystem connecting apparatuses or base stations each disposed in an associated location in the system and each provided with a radio transmission and reception function, a portable-type cordless telephone set in use for a speech transmits, in order to change a combination with a connecting apparatus, a speech path switch request through a manual operation to free or available connecting apparatuses or base stations existing in the proximity of the connecting apparatus currently being linked with the telephone set. Each apparatus sequentially sends a response signal in reply to the speech path switch request such that the telephone set monitors a reception level of the response signal to determine as a switch destination a connecting apparatus of which the response signal develops a highest reception level as a result of the monitor operation. The telephone set instructs a selective initiation of the connecting apparatus as the switch destination via the connecting apparatus having been linked with the telephone set. Thereafter, a speech is carried out via a speech path in a combination of the telephone set and the destination connecting apparatus.

The other object above is achieved as follows. When a reception level being continuously monitored by a portable-type cordless telephone set in use for a speech becomes to be equal to or less than a predetermined level, the telephone set automatically transmits, in order to change the combination with the connecting apparatus, a speech path switch request to available connecting apparatuses in the vicinity of the connecting apparatus currently linked with the telephone set.

The still another object of the present invention is achieved in a private branch radio exchange system employed as a radiotelephone system such that in a state where intrasystem connecting apparatuses are installed at associated positions in an institution or a plant of the system, portable-type cordless telephone sets transmit speech path switch requests at a desired point of time or in an automatic manner.

In short, according to the present invention, under initiative control of a portable-type cordless telephone set, a speech path developing a high reception level is re-established at a desired point of time or in an automatic fashion. A portable-type cordless telephone set is, owing to the functions thereof, carried about and is hence quite often moved to another position while a speech is being conducted. If the range of the displacement is within a particular zone (a minimum unit of the service area of the radiotelephone), the radio wave reception level is relatively high in the portable-type cordless telephone set. Consequently, the quality of the speech voice does not cause any special problem. However, when the telephone set is moved to another zone, the reception level of the radio wave in the neighborhood of a boundary of zone is lowered and hence the quality of speech voice is deteriorated.

As described above, in a case were the quality of speech voice is deteriorated, the portable-type cordless telephone set transmits a speech path switch request at a desired point of time or in an automatic manner to available connecting apparatuses or base stations existing in the periphery thereof so as to select a new connecting apparatus associated with a high reception level and to conduct a speech through the new speech path established through the connecting apparatus.

Particularly, when a private branch radio exchange system is adopted as the radiotelephone system, the connecting apparatuses need only be installed at desired locations in the institution o plant of the system in consideration of a radio wave trouble. In a case where a portable-type cordless telephone set is moved in the proximity of a zone boundary, when the telephone set sends a speech path switch request at an arbitrary point of time or in an automatic manner, a new speech path is re-established with a new connecting apparatus associated with a high reception level. Namely, even when the telephone set is moved through a considerably long way astriding zones, the speech can be conducted without lowering the quality of speech voice.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Referring now to FIGS. 1 to 6, a description will be given of the present invention.

Figure 1:
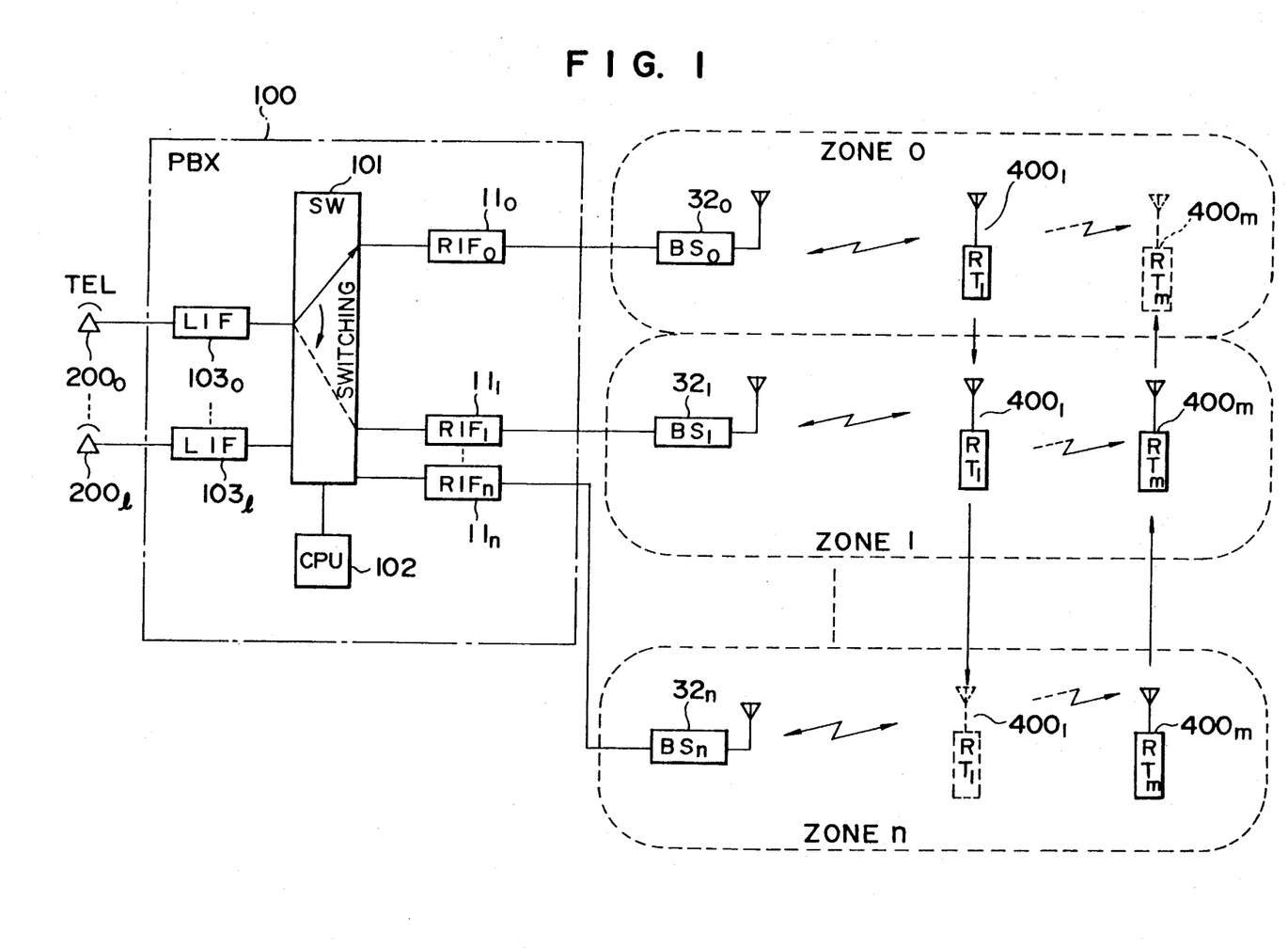
FIG. 1 is a schematic diagram showing a repeating or relay method in a case where the radiotelephone system is applied to a private branch radio exchange system in accordance with the present invention.

First, a radiotelephone system will be described in accordance with the present invention. FIG. 1 shows a repeating or relay method employed in a private branch radio exchange system as an example of the radiotelephone system. As can be seen in this diagram, a private branch radio exchange (to be abbreviated as PBX for convenience herebelow) 100 includes as primary constituent elements thereof a speech path switch 101 and a processor (switch and connection control unit) 102. The speech path switch 101 is connected via ordinary telephone line interface units $103l$ ($l=0, 1, 2, .., l$) to ordinary wire telephone sets $200l$ ($l=0, 1, 2, .., l$); moreover, the switch 101 is linked to portable-type cordless telephone sets $400m$ ($m=0, 1, 2, ..., m$) via radio channel interface units $11n$ ($n=0, 1, 2, ..., n$) and connecting apparatuses or base stations $32n$ ($n=0, 1, 2, ..., n$) through radio channels. Each portable-type cordless telephone set $400m$ is positioned at various locations; however, the telephone set $400m$ is connected under an initiative control thereof to a base station $32n$ ordinarily disposed in a zone including the position of the telephone set $400m$. As a result, a speech is conducted with a partner without causing any deterioration in the voice quality.

For example, in the configuration of FIG. 1, when the portable-type cordless telephone set $400_1$ located in the zone 0 is used to conduct a speech with an ordinary private telephone set $200_0$, there is established a speech path including the ordinary telephone line interface unit $103_0$, the speech path switch 101, the radio channel interface unit $11_0$, and the base station $32_0$. In this state of speech, when the telephone set $400_1$ is moved from the zone 0, for example, to the next zone 1, a speech path switch request is transmitted in the vicinity of the boundary between the zones 0 and 1 from the telephone set $400_1$ through a manual operation or in an automatic manner. As a result, the portable-type cordless telephone set $400_1$ continuously conducts a speech with the ordinary private wire telephone set $200_0$ through the new speech path including the ordinary telephone channel interface unit $103_0$, the speech path switch 101, the radio channel interface unit $11_1$, and the base station $32_1$.

Moreover, in the speech state above, when the telephone set $400_1$ is moved from the zone 1 to the adjacent zone 2, the speech path switch request is manually or automatically transmitted again in the vicinity of the boundary between the zones 1 and 2 from the telephone set $400_1$. As a result, the portable-type cordless telephone set $400_1$ continuously conducts a speech with the ordinary private wire telephone set $200_0$ through the new speech path including the ordinary telephone channel interface unit $103_0$, the speech path switch 101, the radio channel interface unit $11_2$, and the base station $32_2$.

At the same time, if another cordless telephone set $400m$ is moved, for example, from a zone n to a zone n−1 next thereto, the switch operation above is manually or automatically achieved again in the proximity of a boundary between the zones n and n−1. As described above, the telephone set $400m$ continuously conducts a speech with another ordinary wire telephone set $200l$ through another speech path including the ordinary telephone channel interface unit $103l$, the speech path switch 101, the radio channel interface unit $11_{n-1}$, and the base station $32_{n-1}$.

The communication destination subscriber can cope with, as described above, not only ordinary wire telephone sets $200l$ ($l=0, 1, ..., l$) accommodated in the private branch radio exchange 100 but also the portable-type cordless telephone sets $400_m$ ($m=0, 1, 2, m$) as well as office initiation and termination calls transmitted via central office trunks.

Figure 2:
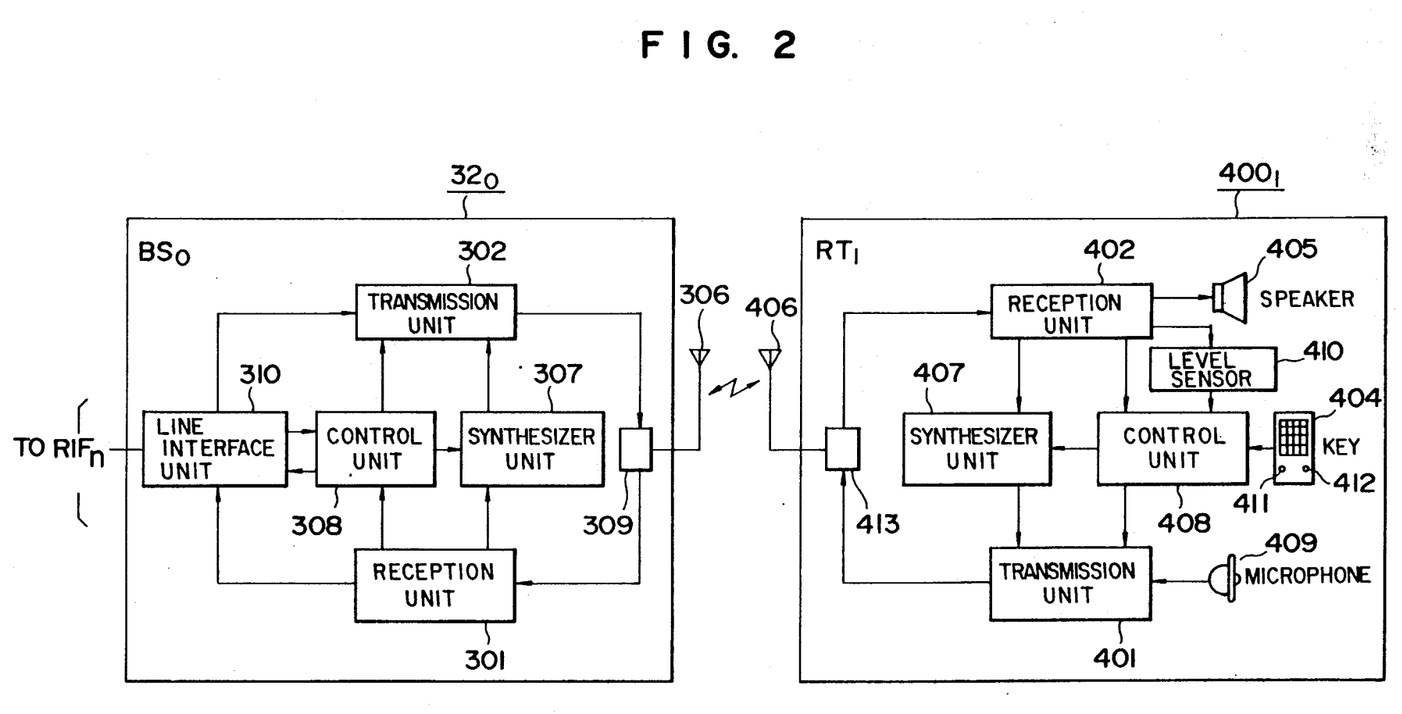
FIG. 2 is a diagram illustratively showing the internal constitution of a portable-type cordless telephone set and a connecting apparatus or base station in the system of FIG. 1 according to the present invention.

Referring next to FIG. 2, description will be given of the portable-type cordless telephone set $400_1$ and the base station $32_0$ (these components being selected only as examples for explanation). The overall send and receive operations of the telephone set $400_1$ is controlled by a control unit 408. When a call is to be issued from the telephone set $400_1$, the control unit 408 causes a synthesizer 407 to send a call initiation signal with a frequency allocated to a predetermined control channel. Moreover, in order to conduct a speech, a base station $32_0$ sets a frequency of the specified speech channel to achieve transmission and reception of the speech voice. A transmission unit 401 transmits, via a transmission and reception separator circuit 413, signals such as a voice signal from a microphone 409 and a dial number signal from a keyboard 404 (including dial number push buttons, a speech path switch request button 411, and manual/auto switch button 412). Furthermore, A reception unit 402 receives the signal from the base station $32_0$ to drive a speaker 405 via the separator circuit 413. The control unit 408 monitors a reception level of the received signal by means of a level sensor or detector 410. As a result of the level check, when the reception level becomes to be below a preset value during a call, the control unit 408 sounds a warning tone or turns a warning lamp on to notify the condition to the user of the telephone set $400_1$. In addition, the controller 408 judges response signals, which will be described later, to determine a response signal having a highest reception level, thereby identifying a base station $32_0$ related to the highest reception level.

On the other hand, the base station $32_0$ is configured in a substantially same manner as for the telephone set $400_1$. The signal from the telephone set $400_1$ is received by a reception unit 301 via an antenna 306 and a transmission/reception separator circuit 309 so as to be then supplied via a line interface unit 310 to a radio channel interface unit $11_0$. Furthermore, a signal from the interface unit $11_0$ is received by the separator circuit 309 via the interface unit 310 and a transmission unit 302 so as to be sent from the antenna 306 to the portable-type cordless telephone set $400_1$. A control unit 308 causes a synthesizer unit 307 to set a frequency allocated to a control channel to receive the signal from the telephone set $400_1$, thereby transmitting the signal to the private branch exchange 100. Moreover, the controller 308 accomplishes controls, for example, to select an available channel for a speech to set a communication channel frequency assigned to the free channel to the synthesizer 307.

Figure 3:
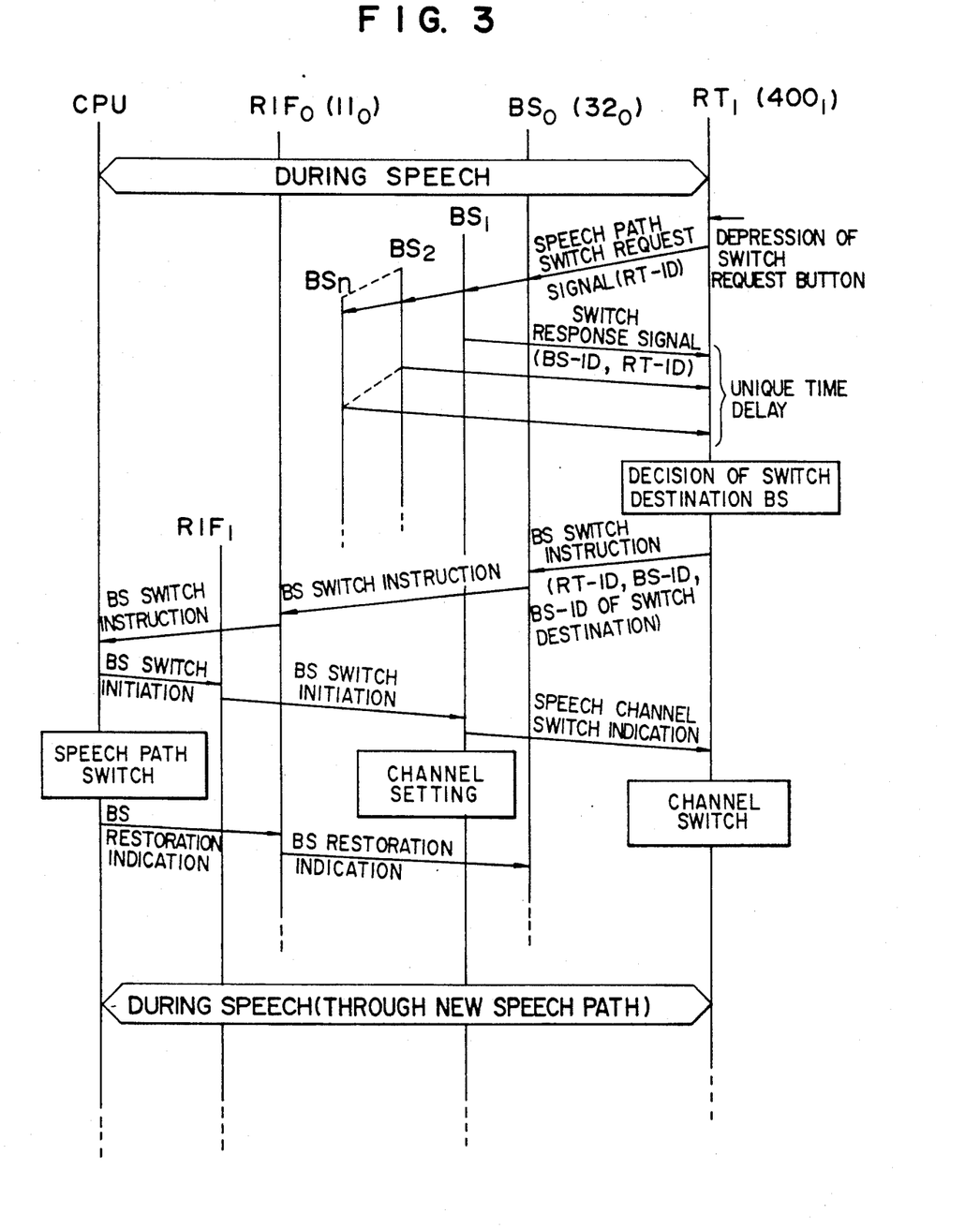
FIG. 3 is an operation sequence chart of an operation in which a speech path switch request is issued from the portable-type cordless telephone set through a manual operation in accordance with the present invention.
Figure 4:
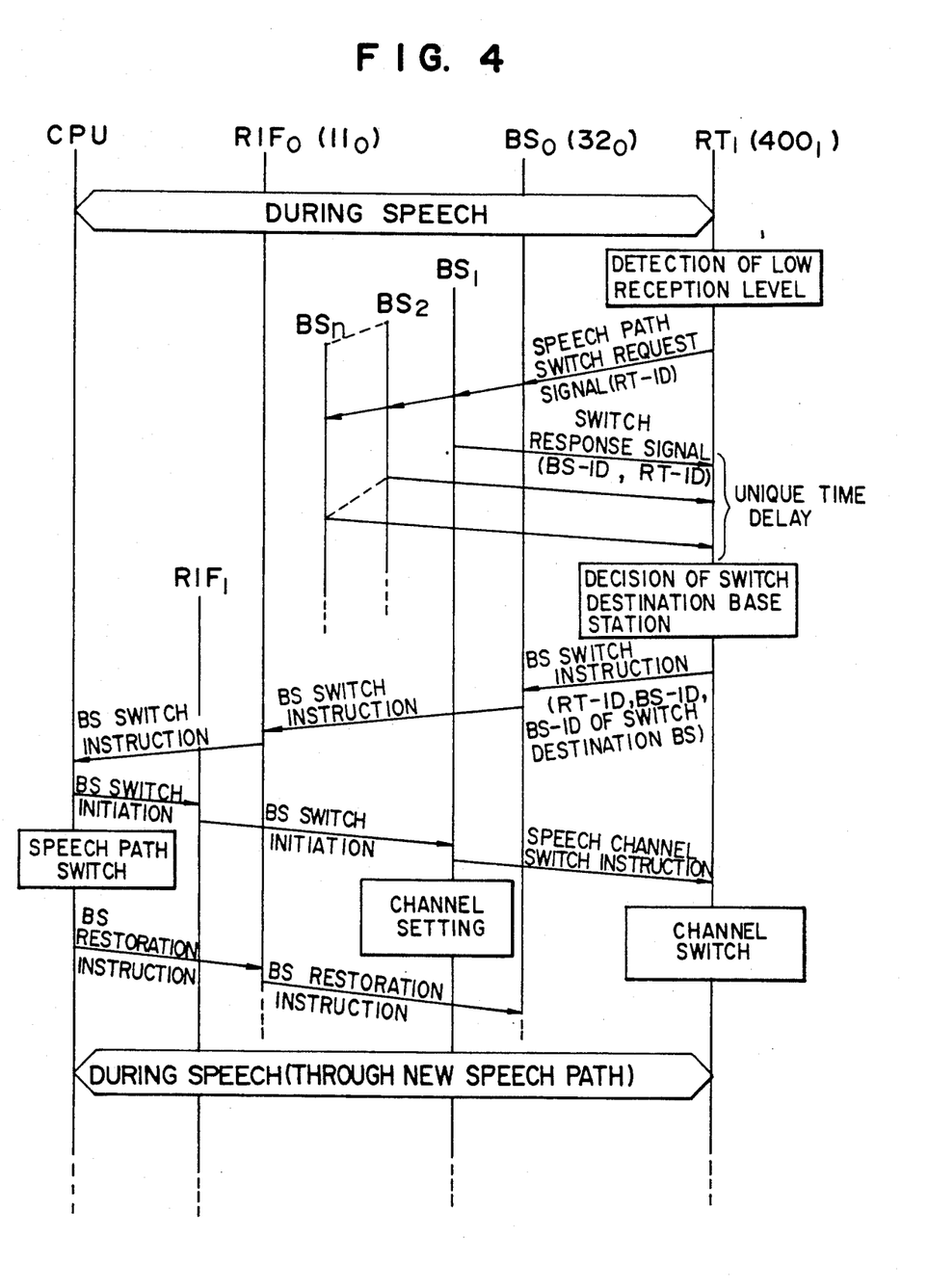
FIG. 4 is an operation sequence chart of an operation in which the speech path switch request is transmitted in an automatic fashion.

Next, a concrete description will be given of the speech path switch method in accordance with the present invention. FIGS. 3 and 4 respectively show sequences of operations in cases where a speech path switch request is manually and automatically sent from the portable-type cordless radio terminal or telephone set $400_1$ (to be abbreviated, for example, as $RT_1$ in the operation sequence chart). The case of the manual operation will now be described by referring to FIG. 3. In a state where the terminal $RT_1$ is linked with the base station $32_0$ (to be designated, for example, as $BS_0$ in the operation sequence) and is being used for a speech, when the user of the terminal $RT_1$ recognizes that the speech path currently established (between the base station $BS_0$ and the terminal $RT_1$) is in a deteriorated state and then operates the speech path switch button 411 of the terminal $RT_1$, a speech switch request signal (including an identification code RT-ID [identification] of the radio terminal $RT_1$) is issued from the terminal $RT_1$. The request signal is received by available or free ones of the base stations $BS_1$ to $BS_n$ existing in the neighborhood of the base station $BS_0$. The stations having received the speech path switch request sequentially return a switch acknowledge or response signal (including the identification code RT-ID and a base station identification code BS-ID) to the terminal $RT_1$. In this connection, each of the stations $BS_1$ to $BS_n$ having received the request signal transmits the switch acknowledge signal with a unique time lag or delay relative to the signal reception. Consequently, on sequentially receiving the switch acknowledge signals, the terminal $RT_1$ measures the reception level of each signal to identify a base station as associated with the highest reception level, thereby selecting the base station BS having the highest reception level as the switch destination base station. When the switch destination base station is thus determined, the radio terminal $RT_1$ sends a base station switch signal (including the identification code RT-ID, the identification code BS-ID of the base station $BS_0$, and an identification code BS-ID of the base station as the switch destination) to the base station $BS_0$. The BS switch signal is then transmitted from the base station $BS_0$ via the radio channel interface unit $RIF_0$ ($11_0$) to the processor 102. In response to the signal, the processor 102 initiates the base station of the switch destination ($BS_1$ in this example) via the radio channel interface unit $RIF_1$ ($11_1$), thereby establishing a speech path to the radio channel interface unit $RIF_1$ ($11_1$). The new base station $BS_1$ thus initiated acquires a free speech channel to send a speech channel switch signal including a code of the acquired speech channel to the radio terminal $RT_1$, which in turn conducts a switch operation between speech paths. Thereafter, the speech is achieved via the new speech path through the base station $BS_1$. Incidentally, for the old speech path using the base station $BS_0$, the processor 102 transmits a restoration instruction for restoring the base station $BS_0$, after the base station $BS_1$ is initiated, via the radio channel interface unit $RIF_0$ ($11_0$) to the old base station $BS_0$, thereby restoring the speech path at a high speed.

Referring next to FIG. 4, a description will be given of a case where the speech path switch request is automatically transmitted. The operation to be conducted in this case is identical to that shown in FIG. 3 excepting that the speech path switch request is automatically sent from the portable-type cordless radio terminal $RT_1$. When the reception level of the radio wave received by the radio terminal $RT_1$ during a speech, which is being continuously monitored in the terminal $RT_1$, becomes to be equal to or less than a preset level, the terminal $RT_1$ automatically transmits a speech path switch request signal.

Figure 5:
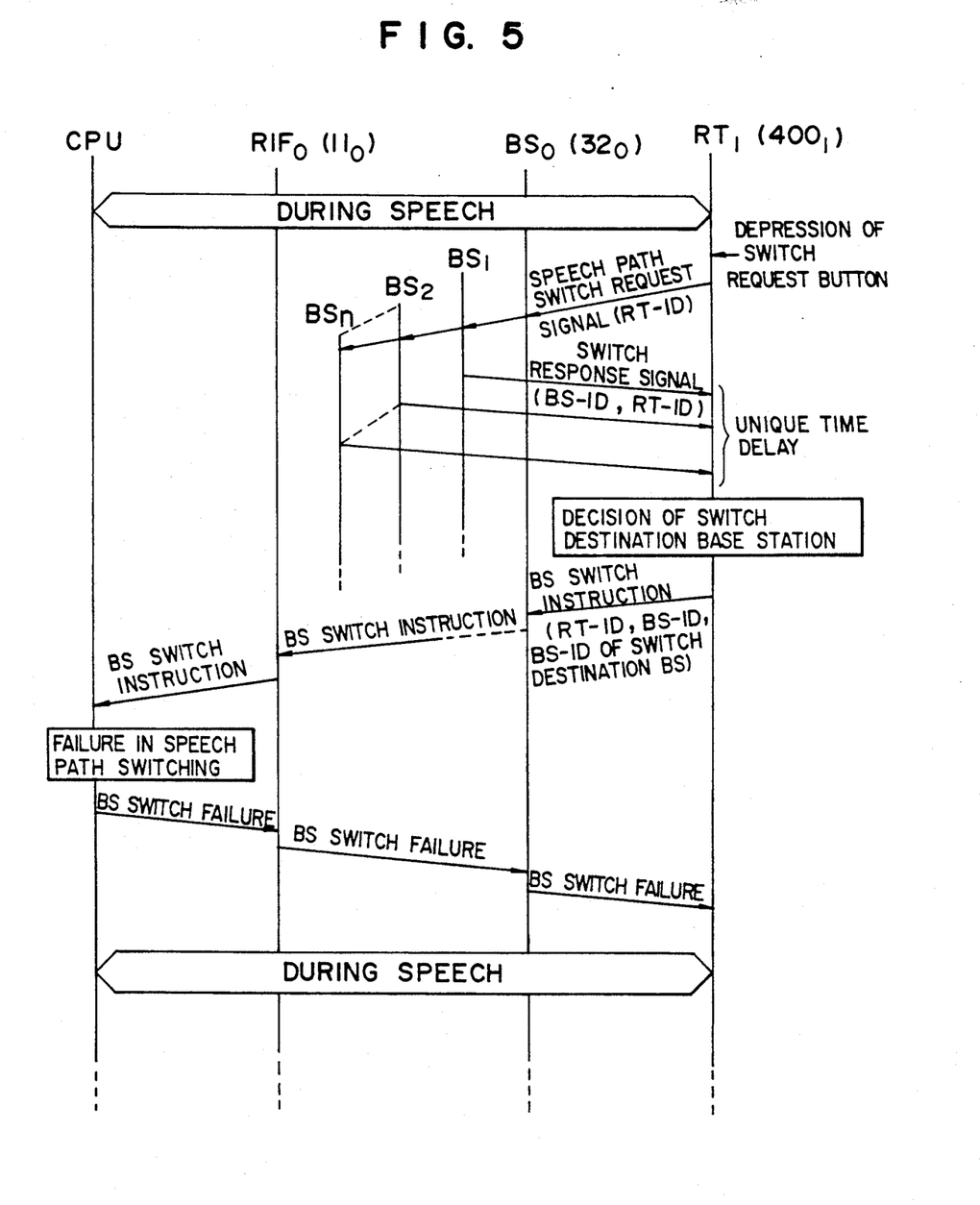
FIG. 5 is an operation sequence chart of an operation in which a speech path cannot be switched in a case where a connecting apparatus or base station cannot be selected or where a speech path cannot be switched between a base station as the switch destination and a call initiating telephone set in the operation sequence of FIG. 3.
Figure 6:
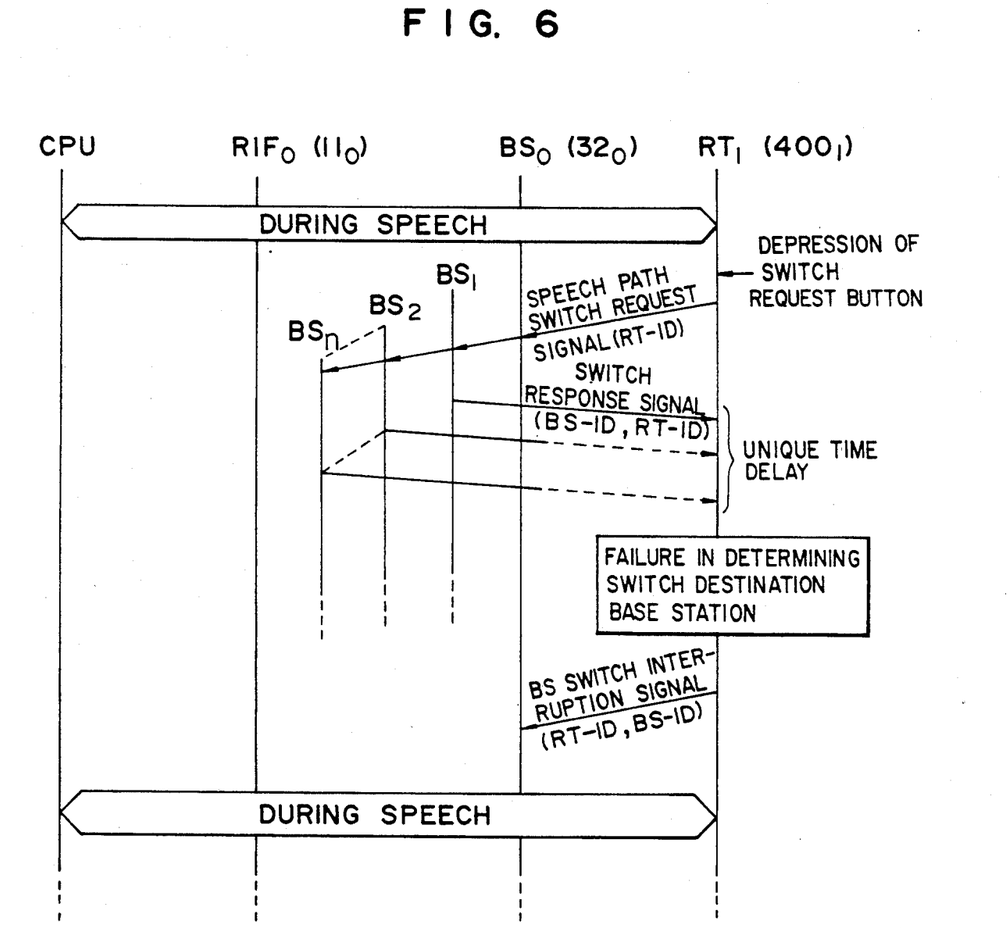
FIG. 6 is an operation sequence chart showing the operation in a case where a base station as a switch destination cannot be determined on the side of the portable-type cordless telephone set or where a switch acknowledge or response signal is missing in the operation sequence of FIG. 3.

The operation sequences of FIGS. 3 and 4 are associated with cases where the speech path switch operation is successfully accomplished. Referring next to FIGS. 5 and 6, description will be given of cases where the speech path switch operation results in a failure.

FIG. 5 shows an operation sequence in a case where a desired speech path switch operation cannot be achieved, for example, under the following conditions. Namely, the processor 102 having received a BS switch instruction signal attempts to select the base station $BS_1$ as the switch destination, which results in a failure for some reasons; or, a speech path switch cannot be established between the switch destination base station $BS_1$ and the call initiating telephone set $RT_1$. When the speech switch operation is considered to be impossible, the processor 102 sends a BS switch failure signal via the radio channel interface unit $RIF_0$ ($11_0$) to the base station $BS_0$ and the telephone set or radio terminal $RT_1$. This restores the terminal $RT_1$ and the base station $BS_0$ to the original speech state. Thereafter, when a speech path switch request is manually or automatically issued, the switch operation is attempted again.

FIG. 6 shows an operation sequence in a case where the base station $BS_1$ as the switch destination cannot be determined on the side of the portable-type cordless radio terminal $RT_1$, for example, in a case where the reception level of the switch response signal is lower than a value for a switch execution level or where the switch response signal is missing in the operation sequence. In this situation, the radio terminal $RT_1$ sends a switch interruption signal to the base station $BS_0$ and then the terminal $RT_1$ and the base station $BS_0$ are reset to the original communication state. Thereafter, like in the case of FIG. 5, when a speech path switch request is manually or automatically issued, the switch operation is attempted again.

As described above, in accordance with the present invention, since a new speech path can be established from the side of the portable-type cordless telephone set, there are attained remarkable advantages as follows.

1. A new speech path developing a high reception level can be manually re-established at an arbitrary point of time.

2. A new speech path developing a high reception level can be automatically re-established at a desired point of time.

3. Portable-type cordless telephone sets or radio terminals can practically develop a satisfactory efficiency also in a private branch radio exchange system.

4. A new speech path developing a high reception level can be simply re-established in a short period of time.

While particular embodiments of the invention have been shown and described, it will be obvious to those skilled in the art that various changes and modifications may be made without departing from the present invention in its broader aspects.

I claim:

1. A speech path switching method in a radio-telephone system in which portable-type cordless telephone sets, respectively connected via speech paths to base stations, are each provided with a radio transmission/reception function, comprising the steps of:

transmitting, in response to manual operation of a switch, a speech path switch request from a portable-type cordless telephone set, being in use for a speech, to available base stations in proximity of a base station currently connected to the portable-type cordless telephone set by a speech path, to switch from the base station currently connected to the portable-type cordless telephone set by said speech path to a switch destination base station to be connected to said portable-type cordless telephone set by a new speech path, when a reception level of a speech signal on said speech path received by said portable-type cordless telephone set becomes less than a predetermined level;

monitoring in the portable-type cordless telephone set reception levels of response signals sent, in response to said speech path switch request, from said available base stations;

selecting as said switch destination base station a base station from said available base stations which sent a response signal having the highest reception level based on said monitoring step;

instructing initiation of operation of the switch destination base station via the base station currently connected to the portable-type cordless telephone set by the speech path; and achieving a subsequent speech via a connection of the portable-type cordless telephone set to the switch destination base station by said new speech path.

2. A speech path switching method in a radio-telephone system in which portable type cordless telephone sets, respectively connected via speech paths to base stations, are each provided with a radio transmission/reception function, comprising the steps of:

transmitting, in an automatic fashion, when a reception level of a speech signal on a speech path continuously monitored by a portable-type cordless telephone set being in use for a speech, becomes to be less than a predetermined level, a speech path switch request from the portable-type cordless telephone set to available base stations in the vicinity of a base station currently connected to the portable-type cordless telephone set by said speech path, to switch from the base station currently connected to the portable-type cordless telephone set by said speech path to a switch destination base station to be connected to said portable-type cordless telephone set by a new speech path;

monitoring in the portable-type cordless telephone set reception levels of response signals sent, in response to said speech path switch request, from said available base stations;

selecting a base station, which sent a response signal having the highest reception level, as said switch destination base station based on said monitoring step;

instructing initiation of operation of the switch destination base station through the base station currently connected to the portable-type cordless telephone set by said speech path; and conducting a subsequent speech via a connection of the portable-type cordless telephone set to the switch destination base station by said new speech path.

3. A method according to claim 1 wherein:

said radiotelephone system includes a private branch radio exchange system in which base stations in the system are located at various positions therein; and each said portable-type cordless telephone set transmits the speech path switch request, when the reception level is lowered, at a particular point in time or in an automatic manner.

4. A method according to claim 2 wherein:

said radiotelephone system includes a private branch radio exchange system in which base stations in the system are located at various positions therein; and each said portable-type cordless telephone set transmits the speech path switch request, when the reception level is lowered, at a particular point in time or in an automatic manner.

5. A method according to claim 1 wherein in the operation in which the available base stations having received the speech path switch request issued through a manual operation of a switch from the portable-type cordless telephone set transmits the response signals, in sequential order to prevent transmission periods of the response signals from the available base stations from being overlapped with each other, wherein a predetermined time delay is assigned to each of said base stations, said time delay being used to determine the transmission period.

6. A method according to claim 2 wherein in the operation in which the available base stations having received the speech path switch request issued in an automatic manner from the portable-type cordless telephone set transmits the response signals, in sequential order to prevent transmission periods of the response signals from the available base stations from being overlapped with each other, wherein a predetermined time delay is assigned to each of said base stations, said time delay being used to determine the transmission period.

7. A method according to claim 1 wherein a user of the portable-type cordless telephone set communicates with a subscriber partner, said partner being a subscriber of an ordinary private telephone set connected to the radiotelephone system.

8. A method according to claim 2 wherein a user of the portable-type cordless telephone set communicates with a subscriber partner, said partner being a subscriber of an ordinary private telephone set connected to the radiotelephone system.

9. A method according to claim 1 wherein the portable-type cordless telephone set includes means for permitting a user to receive a call issued from another portable-type cordless telephone set in a zone different from a zone associated with the user.

10. A method according to claim 2 wherein the portable-type cordless telephone set includes means for permitting a user to receive a call issued from another portable-type cordless telephone set in a zone different from a zone associated with the user.

11. A method according to claim 1 wherein the portable-type cordless telephone set includes means for permitting a user to receive an exchange office initiation/termination call transmitted via an exchange office trunk.

12. A method according to claim 2 wherein the portable-type cordless telephone set includes means for permitting a user to receive an exchange office initiation/termination call transmitted via an exchange office trunk.

13. A method according to claim 1 wherein the response signals sent from said available base stations are sent in sequential order.

14. A method according to claim 2 wherein the response signals sent from said available base stations are sent in sequential order.

* * * * *